US009168726B2

(12) United States Patent
Ponnouradjou et al.

(10) Patent No.: US 9,168,726 B2
(45) Date of Patent: Oct. 27, 2015

(54) CAST FLUOROPOLYMER FILM FOR BUSHINGS

(75) Inventors: Alexis Ponnouradjou, Watertown, MA (US); Christopher M. Comeaux, Worcester, MA (US); Karen M. Conley, Amesbury, MA (US); Frank J. Csillag, Hopkinton, MA (US); Sarah L. Clark, Somerville, MA (US); Raymond J. White, Agawam, MA (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 177 days.

(21) Appl. No.: 13/247,984

(22) Filed: Sep. 28, 2011

(65) Prior Publication Data

US 2012/0106882 A1    May 3, 2012

Related U.S. Application Data

(60) Provisional application No. 61/387,240, filed on Sep. 28, 2010.

(51) Int. Cl.
*B32B 37/20*    (2006.01)
*B32B 37/00*    (2006.01)
(Continued)

(52) U.S. Cl.
CPC ............. *B32B 37/206* (2013.01); *B32B 7/12* (2013.01); *B32B 27/281* (2013.01);
(Continued)

(58) Field of Classification Search
CPC ...... F16C 33/20; F16C 33/201; F16C 33/203; F16C 2208/58; F16C 17/00; F16C 17/10; F16C 17/02; F16C 33/00; F16C 33/02; F16C 33/208; F16C 2223/30; F16C 2223/40; F16C 2223/44; F16C 43/00; F16C 43/02; F16C 2202/50; F16C 2208/32; F16C 33/28; F16C 33/6696; B29C 39/00; B32B 37/0038; B32B 37/02; B32B 2250/05; B32B 2250/40
USPC .......................................................... 384/297
See application file for complete search history.

(56) References Cited

U.S. PATENT DOCUMENTS 3,790,403 A * 2/1974 Ribbans, III ................. 442/180
4,076,207 A * 2/1978 Austin ........................ 249/66.1
(Continued)

FOREIGN PATENT DOCUMENTS

CN    101126418 A    2/2008
EP    1 162 244 A1    12/2001
(Continued)

OTHER PUBLICATIONS

International Search Report from PCT Application No. PCT/US11/53784 dated Apr. 18, 2012, 1 pg.
(Continued)

*Primary Examiner* — Alex Efta
(74) *Attorney, Agent, or Firm* — Chi Suk Kim; Abel Law Group, LLP

(57) ABSTRACT

A method includes casting a friction reducing layer on a carrier, and casting an adhesive layer overlying the friction reducing layer to form a multilayer cast film. The method further includes laminating the multilayer cast film to the load bearing substrate with the load bearing substrate to form a composite and shaping the composite. The load bearing substrate is closer to the adhesive layer than to the friction reducing layer.

12 Claims, 6 Drawing Sheets

(51) Int. Cl.

| | | |
|---|---|---|
| *B32B 37/02* | (2006.01) | |
| *F16C 33/00* | (2006.01) | |
| *F16C 33/02* | (2006.01) | |
| *F16C 33/28* | (2006.01) | |
| *B32B 7/12* | (2006.01) | |
| *B32B 27/28* | (2006.01) | |
| *B32B 27/32* | (2006.01) | |
| *F16C 33/20* | (2006.01) | |
| *B32B 33/00* | (2006.01) | |
| *F16C 17/02* | (2006.01) | |
| *F16C 17/10* | (2006.01) | |
| *F16C 43/02* | (2006.01) | |
| *F16C 33/66* | (2006.01) | |
| *B32B 37/24* | (2006.01) | |
| *B32B 37/12* | (2006.01) | |

(52) U.S. Cl.
CPC .............. *B32B 27/322* (2013.01); *B32B 33/00* (2013.01); *B32B 37/0038* (2013.01); *B32B 37/02* (2013.01); *F16C 17/02* (2013.01); *F16C 17/10* (2013.01); *F16C 33/00* (2013.01); *F16C 33/02* (2013.01); *F16C 33/203* (2013.01); *F16C 33/208* (2013.01); *F16C 33/28* (2013.01); *B32B 37/025* (2013.01); *B32B 37/1284* (2013.01); *B32B 2037/243* (2013.01); *B32B 2250/05* (2013.01); *B32B 2250/40* (2013.01); *B32B 2305/80* (2013.01); *B32B 2309/105* (2013.01); *B32B 2311/00* (2013.01); *B32B 2327/12* (2013.01); *F16C 33/6696* (2013.01); *F16C 43/02* (2013.01); *F16C 2202/50* (2013.01); *F16C 2208/32* (2013.01); *F16C 2223/30* (2013.01); *F16C 2223/40* (2013.01); *F16C 2223/44* (2013.01)

(56) References Cited

U.S. PATENT DOCUMENTS

| | | |
|---|---|---|
| 4,208,472 A | 6/1980 | Cho et al. |
| 4,559,249 A | 12/1985 | Arigaya et al. |
| 4,883,716 A | 11/1989 | Effenberger et al. |
| 5,024,881 A | 6/1991 | Matucha et al. |
| 5,106,673 A | 4/1992 | Effenberger et al. |
| 5,238,748 A | 8/1993 | Effenberger et al. |
| 5,482,637 A | 1/1996 | Rao et al. |
| 5,568,983 A | 10/1996 | Wilson |
| 5,573,846 A | 11/1996 | Harig et al. |
| 5,732,322 A | 3/1998 | Nakamaru et al. |
| 6,425,977 B2 | 7/2002 | McDonald et al. |
| 6,485,608 B1 | 11/2002 | McDonald et al. |
| 6,517,657 B1 * | 2/2003 | Kuenzel et al. .......... 156/244.17 |
| 6,548,188 B1 | 4/2003 | Yanase et al. |
| 6,740,375 B1 | 5/2004 | Sagisaka et al. |
| 7,255,933 B2 | 8/2007 | Sato et al. |
| 7,338,574 B2 * | 3/2008 | Spohn et al. .................. 156/246 |
| 2001/0031596 A1 | 10/2001 | McDonald et al. |
| 2002/0192440 A1 | 12/2002 | Fields et al. |
| 2004/0213492 A1 | 10/2004 | Kim et al. |
| 2006/0046025 A1 | 3/2006 | Latte et al. |
| 2006/0063684 A1 | 3/2006 | Yamamoto et al. |
| 2007/0196632 A1 | 8/2007 | Meyer, Jr. et al. |
| 2008/0247687 A1 | 10/2008 | Stecher |

FOREIGN PATENT DOCUMENTS

| | | |
|---|---|---|
| GB | 2153258 A | 8/1985 |
| JP | 2000117888 A | 4/2000 |
| JP | 2002510347 A | 4/2004 |
| JP | 2004190804 A | 7/2004 |
| JP | 2004249736 A | 9/2004 |

OTHER PUBLICATIONS

Brinkmann, etc, International Plastics Handbook, Chemical Industry Press, China, dated Aug. 31, 2010, pp. 356-357, English Translation included, 10 pages.

\* cited by examiner

CAST FLUOROPOLYMER FILM FOR BUSHINGS

CROSS REFERENCE TO RELATED APPLICATION(S)

The present application claims priority from U.S. Provisional Patent Application No. 61/387,240, filed Sep. 28, 2010, entitled "CAST FLUOROPOLYMER FILM FOR BUSHINGS," naming inventors Sarah Clark, Christopher M. Comeaux, Karen Conley, Frank Csillag and Alexis Ponnouradjou, which application is incorporated by reference herein in its entirety.

FIELD OF THE DISCLOSURE

This disclosure, in general, relates to a cast fluoropolymer film for bushings.

BACKGROUND

Sliding bearing composite materials consisting of a load bearing substrate and a sliding layer overlay are generally known.

Sliding bearing composite materials can be used to form a variety of bearings, such as plain bearing bushing used, for example, by the automotive industry. Such plain bearing bushings can be used for door, hood, and engine compartment hinges, seats, steering columns, flywheels, balancer shaft bearings, etc. Additionally, plain bearing bushings formed from the sliding bearing composite materials can also be used in non-automotive applications.

There is an ongoing need for improved bearings.

SUMMARY

In an exemplary embodiment, a method can include casting a friction reducing layer on a carrier, and casting an adhesive layer overlying the friction reducing layer to form a multilayer cast film. The method can further include laminating the multilayer cast film to a load bearing substrate to form a composite, and shaping the composite. The load bearing substrate can be closer to the adhesive layer than to the friction reducing layer In another exemplary embodiment, a method can include casting first and second friction reducing layers on first and second sides of a polyimide carrier, and casting first and second adhesive layers overlying the first and second friction reducing layers to form first and second multilayer cast films. The method can further include laminating the first and second multilayer cast films to first and second load bearing substrates to form first and second composites, and shaping the composites. In each composite, the load bearing substrate can be closer to the adhesive layer than to the friction reducing layer.

In a further embodiment, a method can include casting an adhesive layer on a surface of a load bearing substrate, and casting a friction reducing layer overlying the adhesive layer to form a composite having a multilayer cast film. The method can further include shaping the composite.

In yet another exemplary embodiment, a bushing can include a load bearing substrate having a first major surface, and cast fluoropolymer film laminated to the first major surface of the load bearing substrate. The cast fluoropolymer film can include a friction reducing layer and an adhesive layer. The load bearing substrate can be closer to the adhesive layer than to the friction reducing layer.

In yet one further embodiment, a bushing can include a load bearing substrate having a first major surface and a cast fluoropolymer film laminated to the first major surface of the load bearing substrate. The cast fluoropolymer film can include a friction reducing layer and an adhesive layer. The load bearing substrate can be closer to the adhesive layer than to the friction reducing layer. The bushing can further include a coating layer overlying the cast fluoropolymer film.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In an exemplary embodiment, a bushing can include a load bearing substrate having a first major surface, and a cast polymer film, such as a cast fluoropolymer film, laminated to the first major surface of the load bearing substrate. The cast polymer film can include a friction reducing layer and an adhesive layer. The load bearing substrate can be closer to the adhesive layer than to the friction reducing layer. The bushing can provide a sliding engagement between two components while substantially reducing the amount of noise and vibrations transmitted between the two components. The friction reducing layer of the cast film can be in contact with a surface of one of the components.

Figure 1:
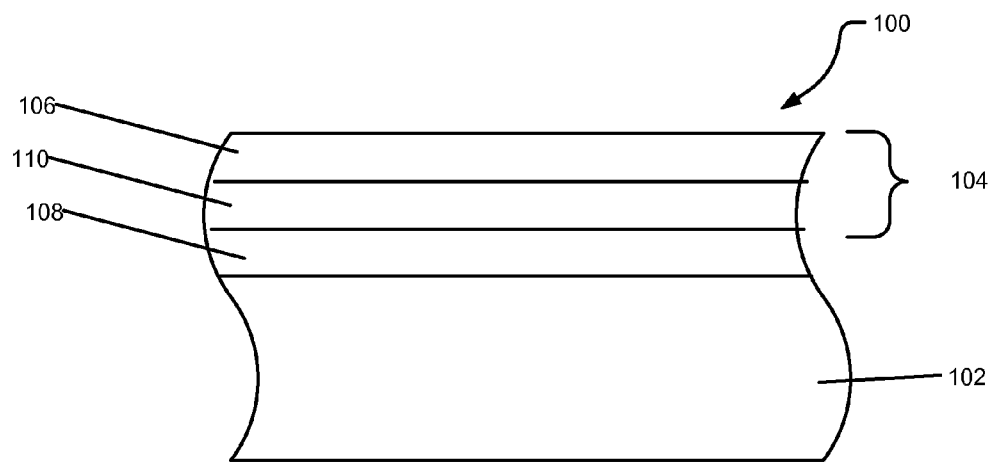
FIG. 1 includes an illustration of the layer structure of exemplary bushing.

FIG. 1 shows a cross section illustrating the various layers of a composite, generally designated 100. In an embodiment, the composite 100 can be a bushing. Alternatively, the composite can be formed into various other structures, such as backing sheets or pans, roofing panels, and the like. Composite 100 can include a load bearing substrate 102. The load bearing substrate 102 can be a metallic support layer. The metallic support layer can include a metal or metal alloy such as steel including carbon steel, spring steel, and the like, iron, aluminum, zinc, copper, magnesium, or any combination thereof.

A multilayer cast film 104 can be laminated to the load bearing substrate 102. The multilayer cast film 104 can include a friction reducing layer 106, an adhesive layer 108, and optionally an intermediate polymer layer 110. Friction reducing layer 106 can include a fluoropolymer, such as polytetrafluoroethylene (PTFE), fluorinated ethylene-propylene (FEP), polyvinylidenfluoride (PVDF), polychlorotrifluoroethylene (PCTFE), ethylene chlorotrifluoroethylene (ECTFE), perfluoroalkoxypolymer, or any combination thereof. In an embodiment, the friction reducing layer 106 can have a coefficient of friction of not greater than about 0.4, such as not greater than about 0.2, even not greater than about 0.15.

Additionally, friction reducing layer 106 can include fillers, such as a friction reducing filler. Examples of fillers that can be used in the friction reducing layer 106 include glass fibers, carbon fibers, silicon, graphite, PEEK, molybdenum disulfide, aromatic polyester, carbon particles, bronze, fluoropolymer, thermoplastic fillers, silicon carbide, aluminum oxide, polyamidimide (PAI), PPS, polyphenylene sulfone (PPSO2), aromatic polyesters including liquid crystal polymers (LCP), and mineral particles such as wollastonite and barium sulfate, or any combination thereof. An LCP is a partially oriented aromatic polyester capable of forming highly oriented regions while in the liquid phase. Fillers can be in the form of beads, fibers, powder, mesh, or any combination thereof. In a particular example, the friction reducing layer can include platelet shaped fillers, such as graphite, boron nitride, mica, or any combination thereof. The platelet shaped fillers can be oriented to align with the friction reducing layer 106. Specifically, the thickness direction of the platelet shaped filler can be substantially parallel to the thickness direction of the friction reducing layer 106.

The adhesive layer 108 can include an adhesive including a fluoropolymer, an epoxy resin, an acrylate resin, a polyimide resin, a polyether/polyamide copolymer, an ethylene vinyl acetate, or any combination thereof. Examples of fluoropolymers included in adhesive layer 108 can be melt-processible fluoropolymers including, for example, an ethylene tetrafluoroethylene copolymer (ETFE), a fluorinated ethylene propylene copolymer (FEP), a perfluoroalkoxy (PFA), or any combination thereof. Additionally, the adhesive can include at least one functional group selected from —C=O, —C—O—R, —COH, —COOH, —COOR, —CF$_2$=CF—OR, or any combination thereof, where R is a cyclic or linear organic group containing between 1 and 20 carbon atoms.

In an embodiment, the adhesive layer 108 can have a thickness of not greater than about 0.5 mil, such as not greater than about 0.4 mil, such as not greater than about 0.3 mil, even not greater than about 0.2 mil. In a particular embodiment, the adhesive layer 108 can have a thickness of at least about 0.1 mil.

Intermediate polymer layer 110 can include a fluoropolymer, such as PTFE, FEP, PVDF, PCTFE, ECTFE, ETFE, PFA, or any combination thereof. In an example, the intermediate polymer layer 110 can include a blend of fluoropolymers, such as a blend of PTFE and PFA. Additionally, intermediate polymer 110 can include a filler, such as a friction reducing filler, a pigment, a scent producing filler, a noise producing filler, or any combination thereof.

In an embodiment, a pigment may be included in the intermediate polymer layer 110 to provide a visual indication of a depth of wear. For example, intermediate polymer layer 110 can include a red pigment. As the bushing wears, the color of the surface can progressively change to red. Upon visual inspection of the bushing, the need to replace the bushing can be readily determined.

In another embodiment, a scent producing filler can be including in the intermediate polymer layer 110 to provide an indication of the need to replace the bushing. For example, intermediate polymer layer 110 can include a filler that produces a pungent aroma when exposed, providing a way to determine the bushing needs to be replaced without stopping to visually inspect the bushing.

In yet another embodiment, a noise producing filler can be including in intermediate polymer layer 110 to provide an indication of the need to replace the bushing. For example, intermediate polymer layer 110 can include a filler that produces an audible indication in response to movement when the intermediate polymer layer 110 is exposed, providing a way to determine the bushing needs to be replaced without stopping to visually inspect the bushing.

In a further embodiment, the tribological properties of the friction reducing layer 106 and the intermediate polymer layer 110 can be modified, such as by changing the type and amount of fillers, the type of polymer, or other suitable approaches. For example, a layer close to the wear surface of the bushing, such as friction reducing layer 106 can have a low coefficient of friction, whereas a layer close to the load bearing substrate, such as intermediate polymer layer 110, can have a reduced wear rate, thereby providing a low friction surface for normal operation while protecting the opposing surface from contacting the load bearing substrate near the end of the working life of the bushing.

Figure 2:
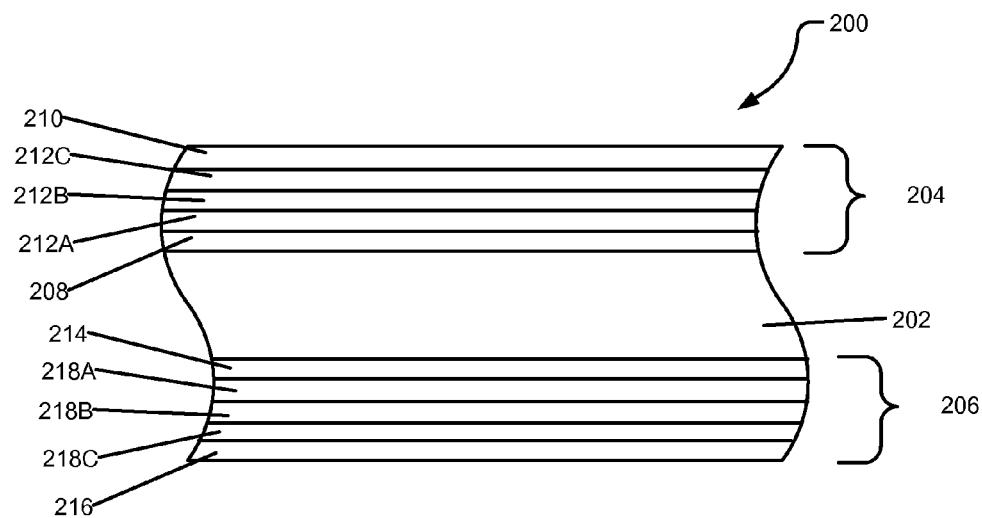
FIG. 2 includes an illustration of an exemplary multilayer cast film.

FIG. 2 illustrates a cross section of another exemplary embodiment of a multilayer structure 200. Multilayer structure 200 can include a removable carrier 202 and a multilayer cast film 204. The multilayer cast film 204 can be laminated to a load bearing substrate and removed from removable carrier 202. The multilayer structure can optionally including a multilayer cast film 206. The carrier 202 can be thermally stable at a sintering temperature of the cast film and can include polymer or metal. In an embodiment, the carrier 202 can be an aluminum sheet. In another embodiment, the carrier can be a polyimide sheet or a silicone coated fabric, such as a glass fabric. In an example, multilayer cast film 204 can include a friction reducing layer 208 in contact with the carrier 202, an adhesive layer 210 forming an outer surface on the multilayer structure, and one or more intermediate polymer layers 212A, 212B, and 212C therebetween. Similarly, multilayer cast film 206 can include a friction reducing layer 214 in contact with the carrier 202, an adhesive layer 216 forming an outer surface on the multilayer structure, and one or more additional intermediate polymer layers 218A, 218B, and 218C therebetween. Friction reducing layers 208 and 214 can be similar to friction reducing layer 106, adhesive layers 212 and 216 can be similar to adhesive layer 108, and intermediate polymer layers 218A, 218B, and 218C can be similar to intermediate polymer layer 110.

Turning to the method of forming the bushing, a multilayer cast film can be formed by casting a polymer dispersion onto a carrier. The carrier can withstand processing conditions, such as the sintering temperature of the cast film. In a particular example, the carrier can be a polyimide carrier. The cast polymer dispersion can be dried to remove solvent and baked to fuse the polymer together into a polymer layer. Optionally, the polymer layer can be calendered. Additionally, the polymer layer can be sintered to reduce the porosity of the polymer layer. This process can be repeated for subsequent layers. In a particular embodiment, the adhesive layer may be added without sintering. Generally, the friction reducing layer would be applied to the carrier as a first layer and the adhesive layer would be applied to the carrier as the last layer so that the adhesive layer is exposed to contact the load bearing substrate during subsequent lamination.

Figure 3:
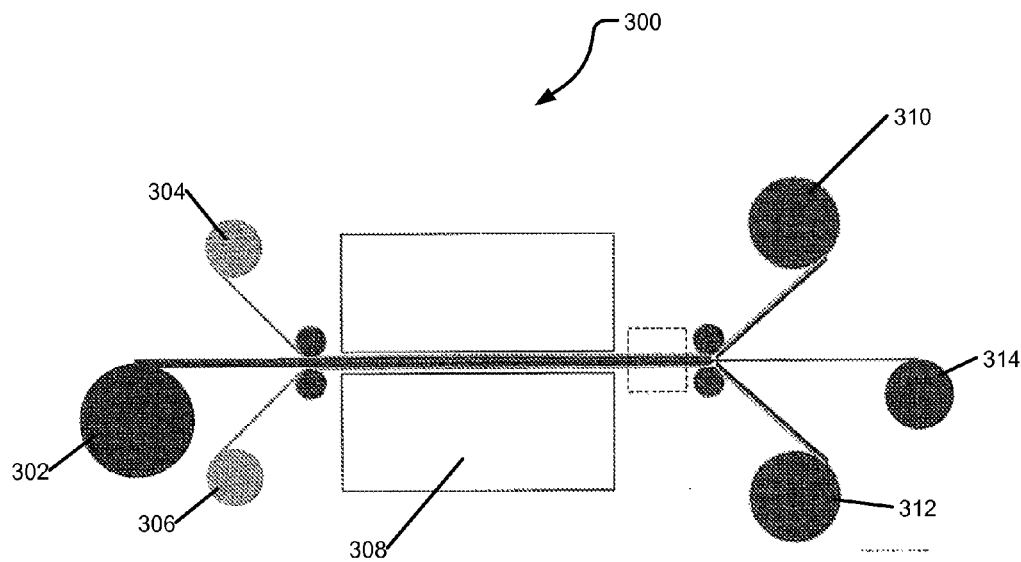
FIG. 3 includes a block diagram illustrating an exemplary system for forming a composite using a multilayer cast film.

The multilayer cast film can be laminated to a load bearing substrate to form a composite sheet. FIG. 3 shows an exemplary system, generally designated 300, for laminating a multilayer cast film to a load bearing substrate. The system 300 can include a multilayer cast film feed roll 302 and load bearing substrate feed rolls 304 and 306. The multilayer cast film feed roll 302 can supply a carrier with a multilayer cast film on either side and load bearing substrate feed rolls 304 and 306 can each supply a load bearing substrate. The system 300 can further include a laminator 308, such as an oven or hot rollers, for laminating the multilayer cast films and the load bearing substrates together to form two composite sheets.

Figure 4:
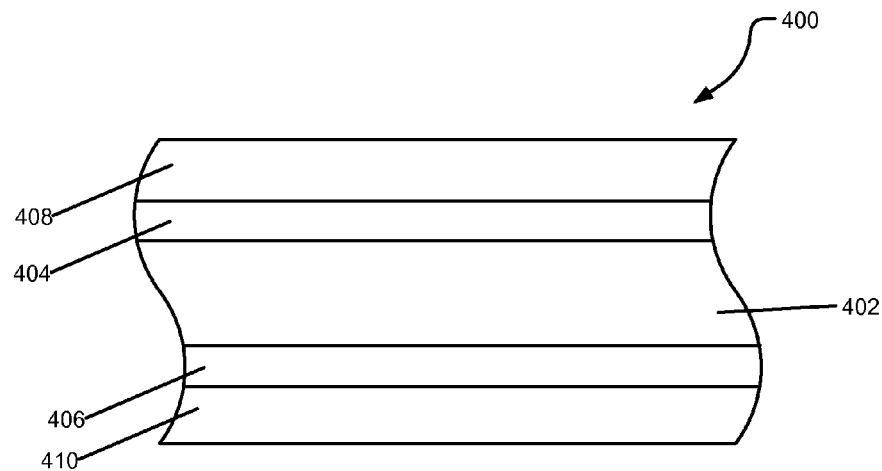
FIG. 4 includes an illustration of an exemplary layer structure during forming a composite using a multilayer cast film FIG. 5 includes an illustration of various embodiment of bushing.

FIG. 4 illustrates the disposition of layers 400 temporarily formed during lamination. The disposition 400 can include a carrier 402, a multilayer cast film 404 overlying the carrier 402 and a multilayer cast film 406 underlying the carrier 402. Substrate 408 can overly the multilayer cast film 404, and substrate 410 can underlie the multilayer cast film 406.

Returning to FIG. 3, the composite sheets can be separated from the carrier and taken up on composite sheet take-up rolls 310 and 312. Additionally, the carrier can be taken up on the carrier take-up roll 314. The carrier can be reused for forming additional multilayer cast films and the composite sheets can be taken for further processing.

In an alternative embodiment, a polymer dispersion including a fluoropolymer adhesive can be cast onto the load bearing substrate. The dispersion can be dried to remove solvent to form an adhesive layer. Optionally, an intermediate polymer dispersion can be cast overlying the adhesive layer and dried to form an intermediate polymer layer. Additionally, a friction reducing polymer dispersion can be applied overlying the adhesive layer or the intermediate layer. The friction reducing polymer dispersion can be dried to remove solvent to form a friction reducing polymer layer, thereby forming a composite sheet having a multilayer cast polymer film including an adhesive layer, a friction reducing layer, and, optionally, an intermediate polymer layer.

In an embodiment, the load bearing substrate can be provided by a feed spool, and the application of the multilayer cast film can be performed in a continuous process. The composite can be retrieved onto a take-up spool. The composite can be supplied from the take-up spool to cutting or shaping equipment. Alternatively, the composite can be supplied to in-line cutting or shaping equipment without the need for retrieval onto a take-up spool.

The composite sheet can be cut into strips or blanks that can be formed into a bushing. The blanks can be formed into the bushing, such as by rolling and flanging the laminate to form a semi-finished bushing of a desired shape. In an embodiment, the bushing can have a cylindrically shaped portion. In another embodiment, the bushing can have a conical shape. Further, the bushing can have a flanged portion on one or more ends. Additionally, the sliding layer can be on an inner surface of the bushing or on an outer surface of the bushing. Alternatively, the composite sheet can be cut and formed into other suitable structures, such as a baking sheet or a roofing panel.

Figure 5:
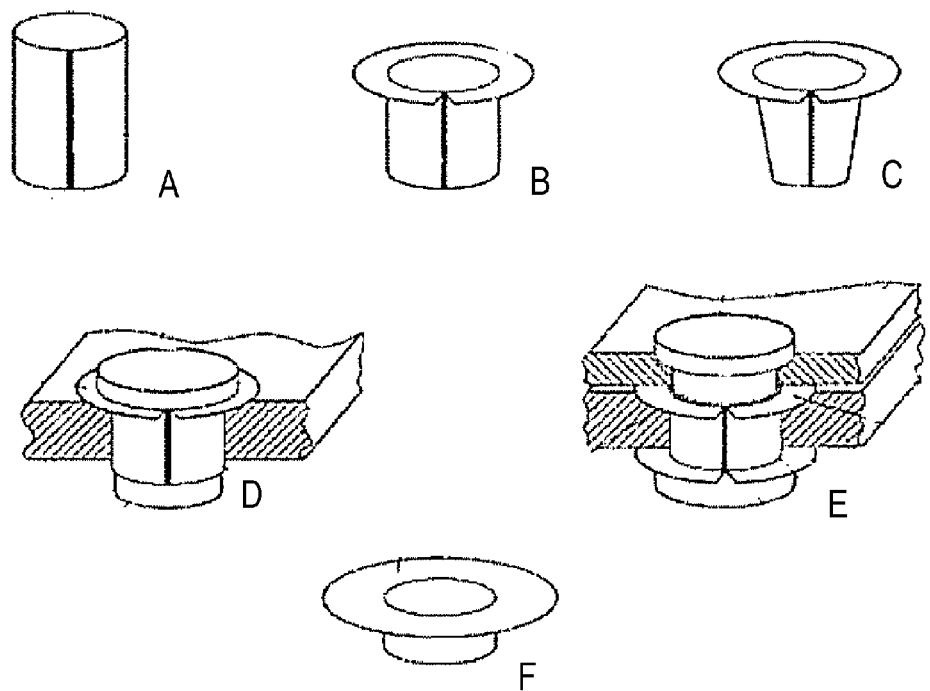

FIGS. 5A through 5F illustrates a number of bushing shapes that can be formed from the blanks. FIG. 5A illustrates a cylindrical bushing that can be formed by rolling. FIG. 5B illustrates a flanged bushing that can be formed by rolling and flanging. FIG. 5C illustrates a flanged bushing having a tapered cylindrical portion that can be formed by rolling a tapered portion and flanging an end. FIG. 5D illustrates a flanged bushing mounted in a housing with a shaft pin mounted through the flanged bushing. FIG. 5E illustrates a two-sided flanged bushing mounted in a housing with a shaft pin mounted through the two-sided flanged bushing. FIG. 5F illustrates an L type bushing that can be formed using a stamping and cold deep drawing process, rather than rolling and flanging.

Figure 6:
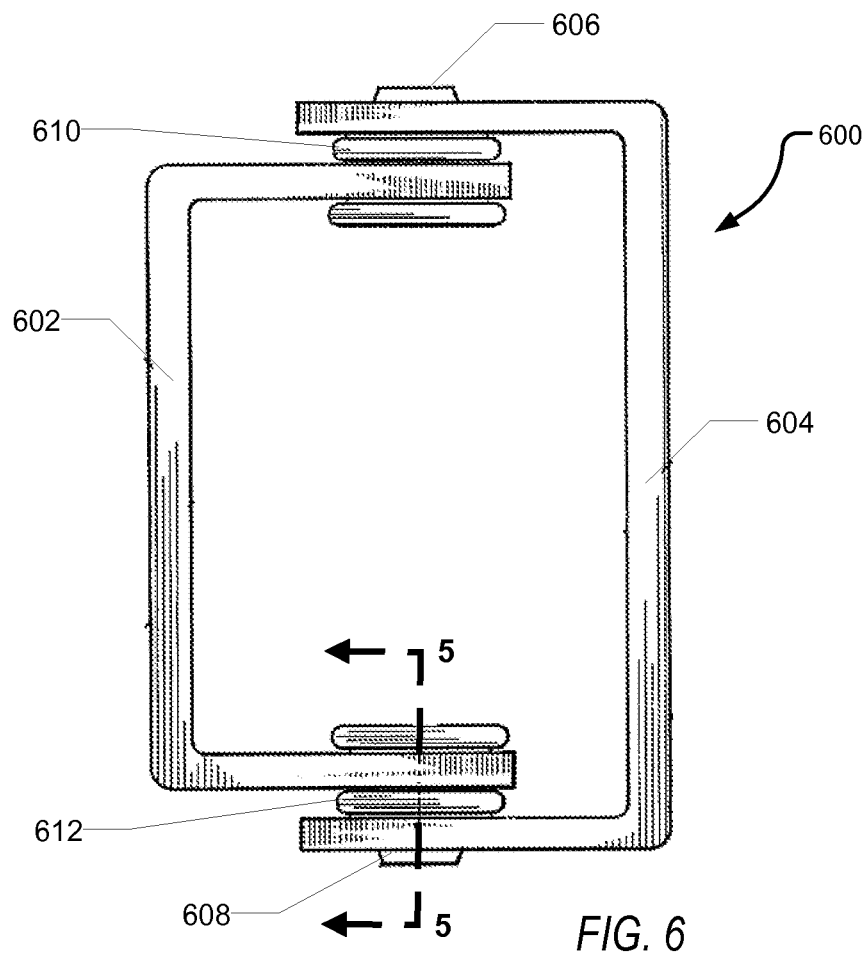
FIGS. 6, 7, and 8 include illustrations of exemplary hinges.
Figure 7:
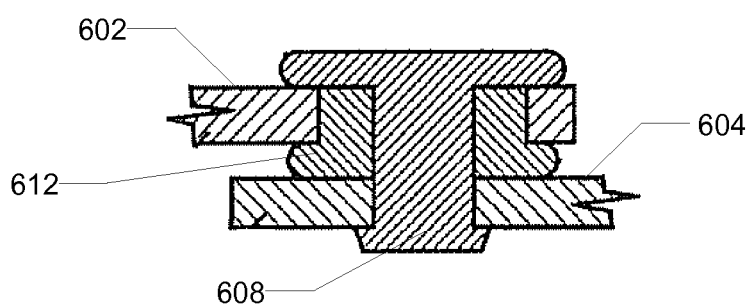

In a particular example, the bushing can be used in a hinge. For example, FIGS. 6 and 7 illustrate an exemplary hinge 600, such as an automotive door hinge, hood hinge, engine compartment hinge, and the like. Hinge 600 can include an inner hinge portion 602 and an outer hinge portion 604. Hinge portions 602 and 604 can be joined by rivets 606 and 608 and bushings 610 and 612. Bushings 610 and 612 can be vibration-damping bushings, as previously described. FIG. 7 illustrates a cross section of hinge 600, showing rivet 608, and bushing 612 in more detail.

Figure 8:
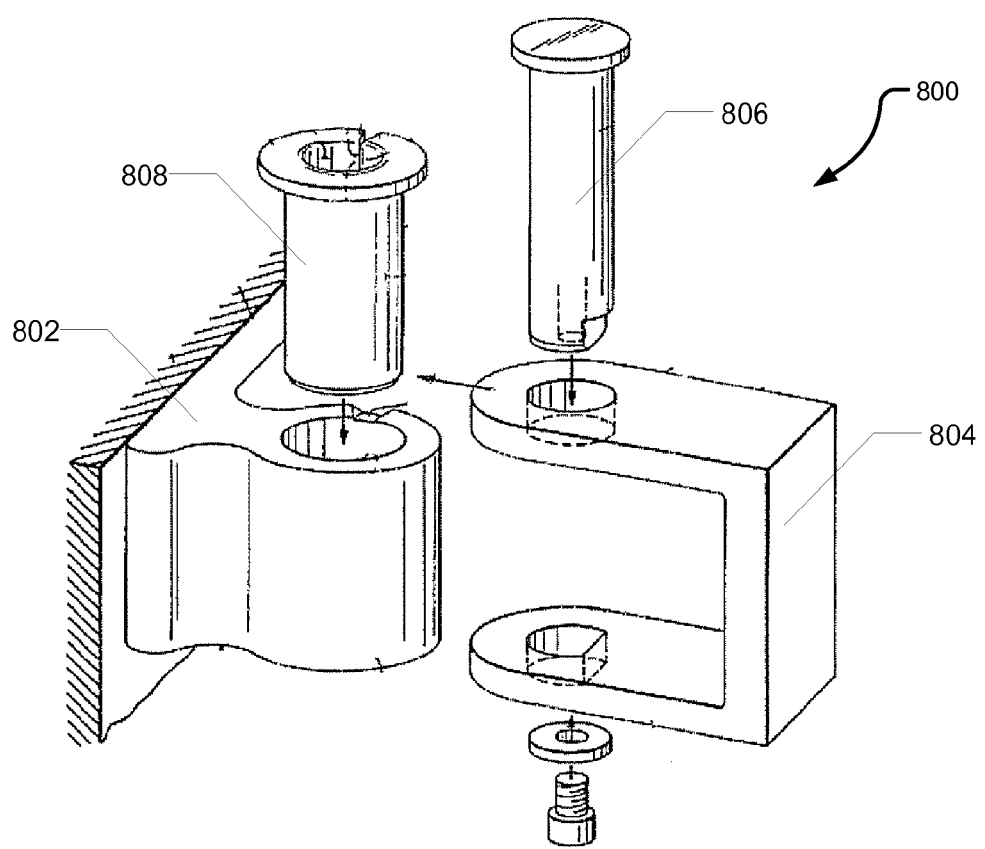

FIG. 8 illustrates another exemplary hinge 800, such as an automotive door hinge, hood hinge, engine compartment hinge, and the like. Hinge 800 can include a first hinge portion 802 and a second hinge portion 804 joined by a pin 806 and a bushing 808. Bushing 808 can be a vibration damping bushing as previously described.

Figure 9:
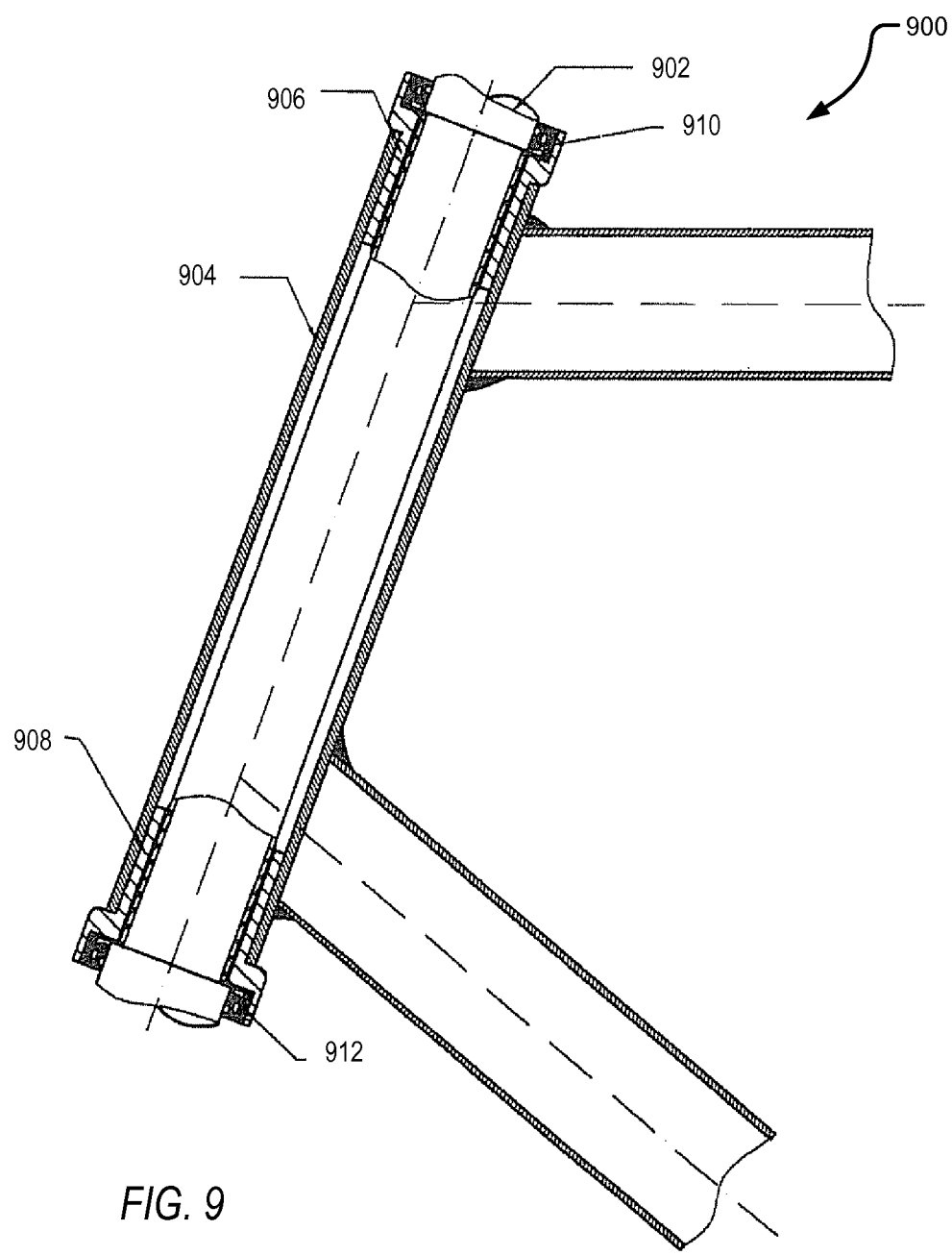
FIG. 9 includes an illustration of an exemplary bicycle headset.

In another example, the bushing can be used in a headset. For example, FIG. 9 illustrates an exemplary headset 900 for a two-wheeled vehicle, such as a bicycle. A steering tube 902 can be inserted through a head tube 904. Bushings 906 and 908 can be placed between the steering tube 902 and the head tube 904 to maintain alignment and prevent contact between the steering tube 902 and the head tube 904. Additionally, seals 910 and 912 can prevent contamination of the sliding surface of the bushing by dirt and other particulate matter.

In an embodiment, the use of a multilayer cast film can provide particular advantages over a skived polymer film. Generally, a skived polymer film is produced from a billet which is produced by sintering a large amount of granular polymer into a single mass. The processing to produce a billet can restrict the use of certain fillers that may be unstable at the sintering temperature or may produce gasses during the sintering process. Using a cast film can significantly reduce the sintering time and allow for off gassing produced by certain filler. Additionally, a cast film can have improved mechanical properties, such as tensile strength and resistance to breakage, when compared to a skived film. Further, the tribological properties of the cast film can be better controlled than within the solid polymer mass of the billet. As a result, the use of a cast film can produce a more consistent product, and the tribological properties can be varied within the different layers of the multilayer cast film.

In a further embodiment, the use of a multilayer cast film can provide particular advantages over the use of a polymer-metal composite. A polymer-metal composite can be formed by calendaring a granular polymer with a metal mesh or coating a porous metal with a polymer dispersion and sintering the polymer-metal composite. The multilayer cast film can provide more control over the tribological properties, e.g. varying the tribological properties by layer, and can produce a thinner product.

In yet another example, a bushing includes a load bearing substrate having a first major surface and a cast fluoropolymer film laminated to the first major surface of the load bearing substrate. The cast fluoropolymer film can include a friction reducing layer and an adhesive layer, the load bearing substrate being closer to the adhesive layer than to the friction reducing layer. The bushing can further include a coating layer overlying the cast fluoropolymer film.

In one embodiment, the coating layer includes a lubricating agent. The lubricant can be selected from oil, wax, grease, polytetrafluoroethylene, graphite, nanodiamonds, detonation nanodiamonds, molybdenum disulfide, carbon particles, minerals, or any combination thereof.

In another embodiment, the coating layer includes partially cured thermoset. Partially cured thermoset includes uncured thermoset precursors. The partially cured thermoset can be selected from epoxy resin, polyimide resin, polyurethane resin, silicone resin, polyester resin, melamine formaldehyde resin, phenol-formaldehyde resin, or any combination thereof.

In yet another embodiment, the coating layer can include a filler.

In embodiments, the coating layer can have a thickness of at least about 0.5 microns, such as at least about 1 micron, at least about 2 microns, at least about 4 microns, at least about 8 microns, at least about 10 microns, at least about 20 microns, at least about 100 microns, or even at least about 500 microns.

In another embodiment, the coating layer can have a thickness of not greater than about 5000 microns, such as not greater than about 2000 microns, not greater than about 1500 microns, not greater than about 1000 microns, not greater than about 800 microns, not greater than about 500 microns, not greater than about 200 microns, not greater than about 100 microns, not greater than about 80 microns, not greater than about 50 microns, not greater than about 40 microns, not greater than about 20 microns, or even not greater than about 10 microns, The embodiments including the coating layer will help to condition the countersurface of a bushing or a bearing during operation. This occurs by stabilizing a transfer film that is developed on the countersurface during operation. The transfer film reduces friction even further or minimizes abrasive effect of the countersurface on the layers of the bearing or bushing. This reduction of wear rate and/or coefficient of friction due to conditioning the countersurface optimizes the long term use of the bearing or bushing.

The coating layer can be applied during or after the lamination process of the substrate material. For example, the coating layer can be applied to the bearing and bushing after the shaping or forming process. Alternatively, the coating layer can be applied shortly before or after installation of the bearing or bushing.

Some suitable condition materials are solid lubricants in form of sub-micron fillers. Such sub-micron fillers can include detonation nanodiamond (DND). In embodiments, the sub-micron fillers can be dispersed in the coating layer. For example, the sub-micron fillers can be dispersed in PTFE, or a resin that contains PTFE.

In another embodiment, the coating layer can include a material that cures during operation. Here, the heat of friction warms up the bearing and the coating layer adheres and cures on the countersurface.

Materials that can be used are partially cured polymers, such as partially cured thermosets. In one embodiment the partially cured thermoset includes uncured thermoset. For example, uncured or partially cured resins, such as epoxy resin, polyimide resin, polyurethane resin, silicone resin, polyester resin, melamine formaldehyde resin, phenol-formaldehyde resin, or any combination thereof can be used.

In one further embodiment, the partially or uncured resin can include lubricants, such as PTFE, sub-micron fillers, such as DND, or other lubricants as described herein or conventionally used.

Moreover, the coating layer can include conditioning agents. Conditioning agents react with the countersurface and help the transfer film to bond or adhere. In one embodiment, for countersurfaces made of metal, the conditioning agents can be chemicals, such as phosphates, organic phosphates, or chelating agents, such as EDTA.

Examples

Sample 1 is a skived film produced from a billet containing a filled PTFE.

Sample 2 is a cast film produced by casting PTFE onto a polyimide carrier.

The mechanical properties of the samples were measured according to ASTM D1708 and D882. Table 1 shows the results.

TABLE 1

|  | Tensile Strength (MPa) | | Strain at Break (%) | |
| --- | --- | --- | --- | --- |
|  | Machine Direction | Cross Machine Direction | Machine Direction | Cross Machine Direction |
| Sample 1 | 11.1 | 8.1 | 82.0 | 48.4 |
| Sample 2 | 11.5 | 12.5 | 237.3 | 220.3 |

The cast film (Sample 2) exhibits improved mechanical properties compared to the skived film (Sample 1). Additionally, the difference between the machine direction and the cross machine direction is lower for Sample 2.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method comprising
casting first and second friction reducing layers on first and second sides of a polyimide carrier;
casting first and second intermediate layers adjacent to and in direct contact with the first and second friction reducing layers, wherein the first and second intermediate layers consists of
a fluoropolymer, the fluoropolymer selected from polytetrafluoroethylene (PTFE), fluorinated ethylene-propylene (FEP), polyvinylidenfluoride (PVDF), polychlorotrifluoroethylene (PCTFE), ethylene chlorotrifluoroethylene (ECTFE), ethylene tetrafluoroethylene (ETFE), perfluoroalkoxypolymer (PFA), and any combination thereof, and
a filler, the filler selected from the group consisting of a friction reducing filler, a pigment, a scent producing filler, a noise producing filler, and a combination thereof;
casting first and second adhesive layers, wherein the first and second adhesive layers includes a melt-processible fluoropolymer, the first and second adhesive layers overlying the first and second intermediate layers to form first and second multilayer cast films;
layering first and second load bearing substrates from a feed spool, the first and second load bearing substrates comprising a continuous metal sheet, onto first and second multilayer cast films;
laminating the first and second multilayer cast films to first and second load bearing substrates with each load bearing substrate closer to the corresponding adhesive layer than to the corresponding friction reducing layer to form first and second composites, wherein a thickness of each of the load bearing substrates is greater than a thickness of each of first and second adhesive layers and the thickness of each of the load bearing substrates is greater than a thickness of each of the first and second friction reducing layers;
removing the polyimide carrier from the first and second multilayer cast films and the loadbearing substrates; and
applying a first and second coating layers onto the first and second friction reducing layers, wherein the first and second coating layers are opposite to the loadbearing substrate, wherein the first and second coating layers comprise a lubricant; and
shaping the composites.

2. The method of claim 1, wherein casting the first and second friction reducing layers includes applying a polymer dispersion to first and second major surfaces of the carrier, drying the polymer dispersion to form a polymer layer, and sintering the polymer layer.

3. The method of claim 2, wherein applying, drying, and sintering the first and second friction reducing layers substantially simultaneously.

4. The method of claim 1, further comprising casting an additional polymer layer overlying each friction reducing layer prior to casting the adhesive layers.

5. The method of claim 1, wherein the adhesive layer includes a polymer selected from the group consisting of a fluoropolymer, an epoxy resin, a polyimide resin, an acrylate, a polyether/polyamide copolymer, ethylene vinyl acetate, and any combination thereof.

6. The method of claim 1, wherein shaping the composite includes rolling and flanging.

7. The method of claim 1, wherein shaping the composite includes rolling and flanging.

8. A method comprising
casting first and second friction reducing layers on first and second sides of a polyimide carrier;
casting first and second adhesive layers to form first and second multilayer cast films, the first and second adhesive layers overlying the first and second friction reducing layers, wherein the first and second adhesive layers includes a melt-processible fluoropolymer consisting of
an ethylene tetrafluoroethylene copolymer (ETFE), a fluorinated ethylene propylene copolymer (FEP), a perfluoroalkoxy (PFA), or any combination thereof, and
a functional group selected from —C=O, —C—O—R, —COH, —COOH, —COOR, —CF2=CF—OR, or any combination thereof, where R is a cyclic or linear organic group containing between 1 and 20 carbon atoms;
layering first and second load bearing substrates from a feed spool, the first and second load bearing substrates comprising a continuous metal sheet, onto first and second multilayer cast film;
laminating the first and second multilayer cast films to first and second load bearing substrates with each load bearing substrate closer to the corresponding adhesive layer than to the corresponding friction reducing layer to form first and second composites, wherein a thickness of each of the load bearing substrates is greater than a thickness of each of first and second adhesive layers and the thickness of each of the load bearing substrates is greater than a thickness of each of the first and second friction reducing layers;
removing the polyimide carrier from the first and second multilayer cast films and the loadbearing substrates; and
applying a first and second coating layers onto the first and second friction reducing layers, wherein the first and second coating layers are opposite to the loadbearing substrate, wherein the first and second coating layers comprise a lubricant; and
shaping the composites.

9. The method of claim 8, wherein casting the first and second friction reducing layers includes applying a polymer dispersion to first and second major surfaces of the carrier, drying the polymer dispersion to form a polymer layer, and sintering the polymer layer.

10. The method of claim 9, wherein applying, drying, and sintering the first and second friction reducing layers substantially simultaneously.

11. The method of claim 8, further comprising casting an additional polymer layer overlying each friction reducing layer prior to casting the adhesive layers.

12. The method of claim 8, wherein the adhesive layer includes a polymer selected from the group consisting of a fluoropolymer, an epoxy resin, a polyimide resin, an acrylate, a polyether/polyamide copolymer, ethylene vinyl acetate, and any combination thereof.

* * * * *